United States Patent [19]

Ortiz

[11] Patent Number: 4,977,575
[45] Date of Patent: Dec. 11, 1990

[54] ADJUSTABLE APERTURE COMPRISING A SHAPE MEMORY ALLOY AND LASER USING SAME

[75] Inventor: Mark V. Ortiz, Mountain View, Calif.

[73] Assignee: Spectra-Physics, Inc., Mountain View, Calif.

[21] Appl. No.: 398,005

[22] Filed: Aug. 24, 1989

[51] Int. Cl.⁵ .............................................. H01S 3/08
[52] U.S. Cl. .................................................. 372/103
[58] Field of Search .................. 372/18, 19, 98, 103

[56] References Cited

U.S. PATENT DOCUMENTS

| | | | |
|---|---|---|---|
| 3,936,770 | 2/1976 | Reintjes et al. | 372/19 |
| 4,268,799 | 5/1981 | McCrickerd | 372/103 |
| 4,496,518 | 1/1985 | Marie | 372/19 |
| 4,675,500 | 6/1987 | Kunz et al. | 372/103 |
| 4,751,706 | 6/1988 | Rohde et al. | 372/103 |

OTHER PUBLICATIONS

Mondotronics Product Brochure.
Product Brochure: Biometal by Mondo-Tronics, Inc., 1014 Morse Ave., Suite 11, Sunnyvale, Calif., 94089.

*Primary Examiner*—William L. Sikes
*Assistant Examiner*—Robert E. Wise
*Attorney, Agent, or Firm*—Fliesler, Dubb, Meyer & Lovejoy

[57] ABSTRACT

A wire, comprising a shape memory alloy, is shaped to define a perimeter of an aperture having an adjustable size. The wire is responsive to current flow through the wire to vary the length of the wire, and thereby the length of the perimeter of the aperture. A controllable power supply is coupled to the wire, for supplying a controllable current through the wire to adjust its length, and thereby to adjust the size of the aperture. The aperture is suited for controlling transverse modes in a laser by controlling diffraction losses in the laser resonant cavity. Also, the shape memory alloy aperture is suitable for mounting within a sealed cavity laser.

8 Claims, 2 Drawing Sheets

ADJUSTABLE APERTURE COMPRISING A SHAPE MEMORY ALLOY AND LASER USING SAME

FIELD OF THE INVENTION

The present invention relates to adjustable apertures, and, more particularly, to adjustable apertures suitable for use in controlling transverse modes in lasers.

DESCRIPTION OF RELATED ART

A variety of applications exists for adjustable apertures by which the amount of light that passes through a given passage can be regulated. For instance, photographic systems typically use irises that consist of a plurality of overlapping leaves forming an aperture around their inner perimeter. The position of the leaves is controlled in order to adjust the size of the aperture.

In lasers, apertures are often used to suppress transverse modes of laser oscillation. A given laser cavity can support a number of transverse modes. The transverse modes of the laser have different cross-sectional geometries and sizes. In order to suppress a given transverse mode, the aperture is positioned along the resonant path or "optical axis" and set with a size smaller than the cross-section of the mode to be suppressed.

Many laser mediums will oscillate at a variety of longitudinal modes. The beam diameter of a given transverse mode in those lasers will vary depending on the wavelength of light in the desired longitudinal mode. For shorter wavelengths, the beam is smaller (at its $1/e^2$ intensity) for the same transverse mode, requiring a small aperture in order to suppress the higher order transverse modes. For longer wavelengths, the transverse modes have larger beam diameters. Therefore, a larger aperture is required to allow the desired mode to lase while suppressing unwanted higher order transverse modes.

Prior art systems providing adjustable mode control apertures in lasers have used a wheel having a plurality of pre-cut apertures. The wheel is turned so that the desired aperture is placed in alignment with the laser beam. If the wavelength to be produced by the laser is changed, the wheel is turned to align a different aperture with the beam. Fixed diameter apertures can also be screwed into a thread concentric with the optical axis of the resonator. Obviously, an iris type aperture, common in photographic systems, is used as well to control transverse modes of lasers.

The disadvantages of using the wheel having a plurality of pre-cut apertures arise from difficulty in fabricating the wheel. Each aperture must be precisely aligned with a center of each aperture being an equal distance from the center of the wheel. Further, precise alignment of the center of the wheel during manufacture is required. These close manufacturing specifications are necessary to ensure that, as the wheel turns, and a new aperture becomes aligned with the beam, the aperture will remain centered on the beam. Iris type apertures are difficult to manufacture in a manner that provides precise control of the desired aperture size for mode suppression in lasers. Further, they involve a large number of pieces that must be assembled in precision manufacturing operations. These apertures are also of a fixed diameter (save for the iris aperture) and thus do not allow one to continuously vary the aperture diameter which results in either too much or too little diffraction loss than is optimal.

In addition, it is desirable to place apertures in sealed cavity lasers (i.e., lasers with mirrors internal to the vacuum in a gas laser). The wheel type adjustable aperture and the iris type adjustable aperture are not well suited to sealed cavity lasers because of the large number of moving parts and the relatively complicated mechanical structure required to change the aperture size. Also, vacuum integrity precludes the use of many materials and requires that all materials be cleaned meticulously well.

Accordingly, it is desirable to provide an aperture that is adjustable, easy to manufacture, low in cost, reliable, and can be used in sealed cavity lasers.

SUMMARY OF THE INVENTION

The present invention is an apparatus providing an aperture having an adjustable size. A wire, comprising a shape memory alloy (SMA—usually a nickel-titanium alloy), is shaped to define a perimeter of the aperture. The metal wire undergoes a phase change and contracts when heated. If ohmically heated by applying current flow through the wire, the length of the wire and thus the diameter of the aperture is varied. A controllable power supply is coupled to the wire, for supplying a controllable current through the wire to adjust its length, and thereby to adjust the size of the aperture. According to one aspect, the shape of the wire is helical.

According to another aspect, the present invention is utilized for controlling transverse modes in a laser.

According to yet another aspect, the shape memory alloy aperture is mounted within a sealed cavity laser.

Other aspects and advantages of the present invention will be seen upon review of the figures, the detailed description and the claims which follow.

DETAILED DESCRIPTION

A detailed description of preferred embodiments of the present invention is described with reference to FIGS. 1–5.

Figure 1:
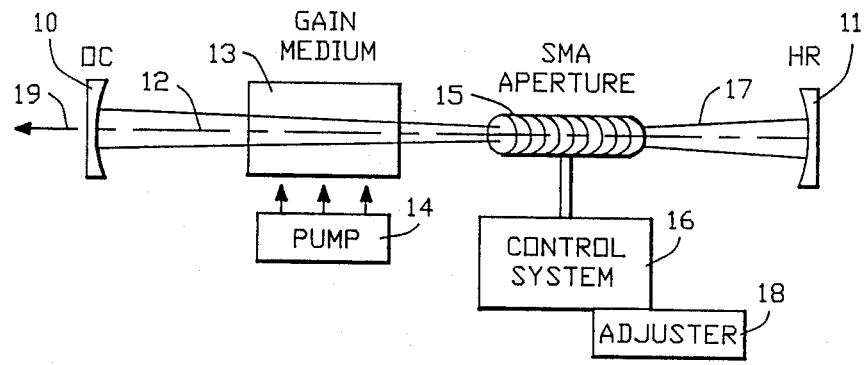
FIG. 1 is a schematic diagram of a laser system utilizing the SMA aperture, according to the present invention.

FIG. 1 shows a schematic diagram of a laser system utilizing the SMA aperture, according to the present invention. The laser system includes an output coupler 10, and a high reflecting mirror 11 mounted to form a resonant cavity. An optical path 12 lies within the cavity between the output coupler 10 and the high reflecting mirror 11. A gain medium 33 (solid, liquid or gas) is mounted along the optical path within the resonant cavity. A pump energy source 14 is coupled with the gain medium to induce laser action within the resonant cavity. An SMA aperture 15, according to the present invention, is mounted along the optical path 12 within the resonant cavity. A control system 16 is coupled to the SMA aperture 15 for controlling the size of the aperture as described in more detail below.

Schematically shown in FIG. 1 is an outline 17 of a transverse mode of oscillation within the resonant cavity. The cross-sectional size of the transverse mode 17 is limited by the size of the aperture within the SMA aperture device 15. Transverse modes having beam diameters larger than the size of the aperture at their lasing threshold are suppressed.

The control system 16 is coupled to an adjustment mechanism 18, by which an operator can control the electronic actuation of the SMA aperture 15 by varying the voltage across 15. For instance, a technician can monitor the output 19 of the laser system to determine which transverse modes are oscillating. By turning a knob on the control system 16, the size of the aperture can be varied until a desired transverse mode is oscillating and this knob setting on 18 can be recorded.

Figure 2:
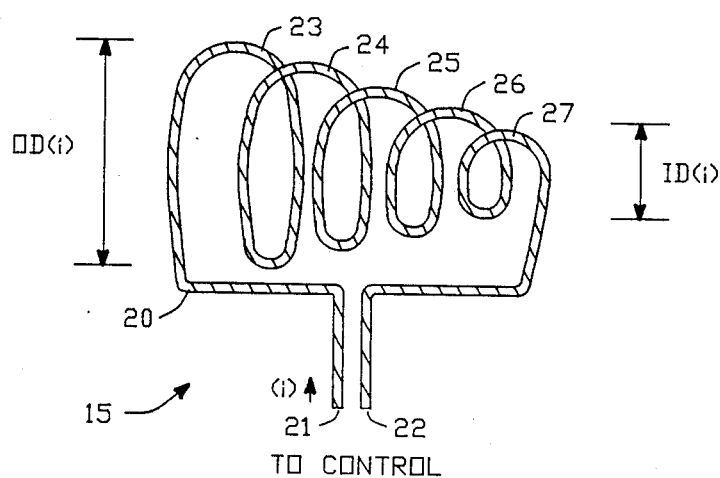
FIG. 2 is a diagram of a preferred embodiment of the SMA aperture, according to the present invention.

FIG. 2 shows a perspective view of the SMA aperture device 15. The aperture comprises a wire 20 having a first end 21 and a second end 22. The wire is shaped into a helical coil having progressively smaller loops. Thus, the first loop 23 has a diameter OD(i) larger than the diameter of the second loop 24. The second loop has a diameter larger than the diameter of the third loop 25. The third loop 25 has a diameter larger than the diameter of the fourth loop 26, and so on until the last loop 27 defines the inner diameter ID(i) of the SMA aperture device. This loop forming the inner diameter ID(i) defines a perimeter of the aperture which is adjustable in size. The number of loops necessary for complete suppression of all higher order transverse modes will depend upon the gain of the particular lasing medium used.

The wire 20 is formed of nickel-titanium shape memory alloy, such as the product sold under the trademark BioMetal by Mondo-Tronics, Inc., 1014 Morse Avenue, Suite 11, Sunnyvale, Calif. 94089.

The nickel-titanium shape memory alloy, known as BioMetal, shortens in length when electrically activated from 3 to 10% of the original length. Thus, by electrically activating the wire by supplying a current i, the size of the perimeter ID(i) can be adjusted by an equivalent 3 to 10%.

Figure 3:
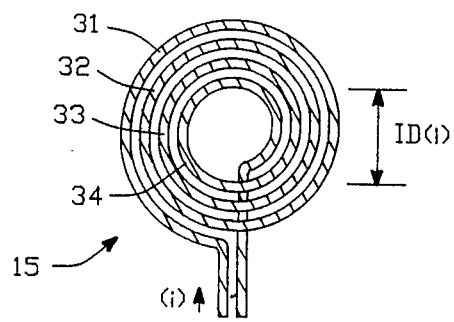
FIG. 3 is a view through the aperture of the SMA aperture, according to the present invention.

FIG. 3 is a view of the preferred SMA aperture 15 looking through the aperture. The first coil 31 has a large outer diameter. Each succeeding coil 32, 33, 34 has a progressively smaller diameter to suppress oscillation in the region between the last coil 34 and the first coil 31 as illustrated in the figure.

Figure 4:
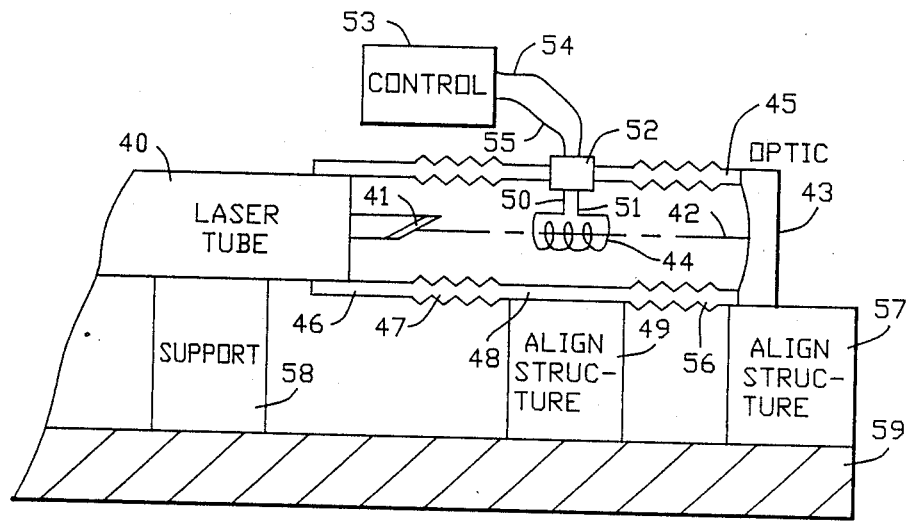
FIG. 4 is a schematic diagram of a sealed cavity laser system utilizing the SMA aperture of the present invention.

FIG. 4 illustrates a sealed cavity laser system using the SMA aperture, according to the present invention.

The sealed cavity laser system uses a plasma tube 40 as a gain medium. The plasma tube is sealed by Brewster window 41. Light travels along optical path 42 to an optic 43, such as a high reflecting mirror or output coupler. The SMA aperture 44 is mounted along the optical path 42 within a chamber defined by a structural seal 45 coupling the optic 43 to the laser tube 40. The structural seal 45 includes a first cylindrical segment 46, which is connected to a cylindrical vacuum bellows segment 47. The cylindrical vacuum bellows segment 47 is coupled to an adjustable cylindrical segment 48. The adjustable cylindrical segment 48 is supported by an alignment structure 49 by which the position of the segment 48 is adjusted in the x and y transverse dimensions relative to the resonant path 42. The SMA aperture 44 is mounted in the segment 48 to pins 50 and 51, which are coupled to a vacuum feedthrough mechanism 52. Control system 53 is coupled across lines 54 and 55 to the vacuum feedthrough mechanism 52 and provides current for controlling the size of the aperture 44.

The adjustable segment 48 is coupled to a second vacuum bellows segment 56, which is coupled to the optic 43. The optic 43 is supported by an alignment structure 57 which translates and tilts the optic 43 to adjust and align the laser.

The laser tube 40 is supported by support structure 58 which is coupled to the laser base 59. The alignment structures 49 and 57 are also coupled to the laser base 59.

Figure 5:
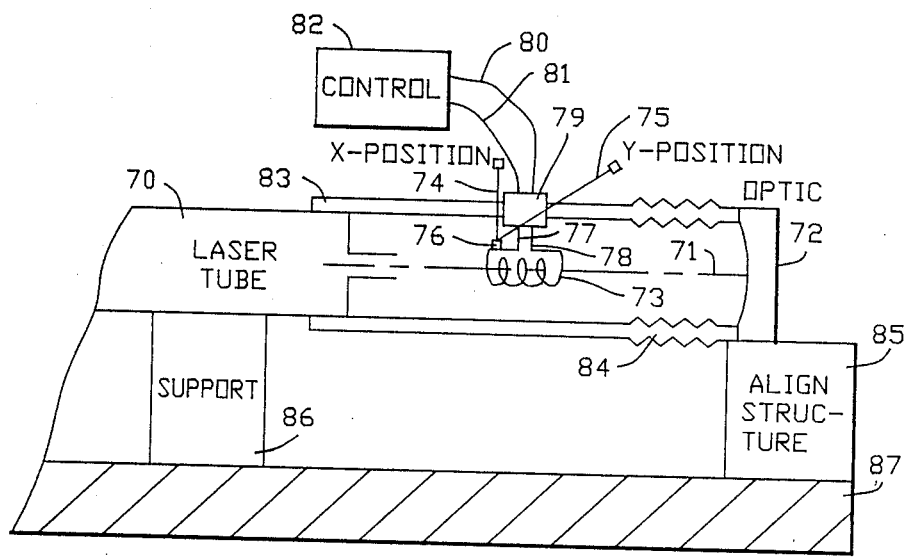
FIG. 5 is a schematic diagram of an alternative embodiment of a sealed cavity laser system utilizing the SMA aperture, according to the present invention.

FIG. 5 illustrates an alternative embodiment of a sealed cavity laser system utilizing the SMA aperture, according to the present invention. In the sealed cavity laser system of FIG. 5, a laser tube 70 provides a gain medium. The laser tube generates oscillation along an optical path 71 through the tube. An optic 72, such as a high reflecting mirror or output coupler, is mounted along the optical path 71 to support oscillation along the resonant path 71.

The SMA aperture 73 is supported along the optical path 71 by an x position support pin 74 and a y position support pin 75. The x position support pin 74 and the y position support pin 75 are coupled to the SMA aperture wire at block structure 76, which allows expansion and contraction SMA wire while maintaining its position. The SMA wire of aperture 73 is coupled by flexible wires 77 and 78 through vacuum feedthrough 79 to wires 80 and 81 and on to the control system 82.

The x position support pin 74 extends through wall 83 of the seal chamber. Likewise, the y position support pin 75 extends through the wall 83 to the outside. Precision adjustment mechanisms allow positioning of the SMA aperture 74 precisely along the optical path 71, as required.

In the system of FIG. 5, the wall 83 is coupled to a vacuum bellows 84 which is coupled to the optic 72. The optic 72 is supported on an alignment structure 85 for precise alignment of the optic 72 along the resonant path 71. The laser tube 70 is supported by a support structure 86. Both the support structure 86 and the alignment structure 85 are mounted on laser base 87.

The embodiments illustrated in FIGS. 4 and 5 are examples of positions of the SMA aperture that could be used. In an alternative system, the SMA aperture could be mounted within the laser tube outside of the discharge region.

A system believed particularly suited to utilization of the SMA aperture, according to the present invention, is the Spectra-Physics model S-P 2016, internal mirror argonion laser. The S-P 2016 could be modified using either of the schemes of FIGS. 4 or 5 as meets the needs of a particular system.

The helical shapes illustrated in FIGS. 2 and 3 are meant to show a preferred embodiment. Obviously, many other aperture shapes could be utilized, depending upon the transverse mode desired and the gain of the laser medium considered.

Thus, it can be seen that the present invention provides an adjustable aperture suitable for use in sealed cavity lasers which is simple to mount with the lasers and has no moving parts.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus providing an aperture having an adjustable size, comprising:
   a wire comprising a shape memory alloy, the wire having a first end, a second end and a length, and a shape along the length defining a perimeter of the aperture and responsive to current flow through the wire to vary the length;
   control means, connected to the first and second ends of the wire, for supplying a controllable current through the wire to adjust the size of the aperture.

2. The apparatus of claim 1, wherein the shape defining the perimeter of the aperture is helical.

3. An apparatus for controlling transverse modes in a laser resonant cavity defining an optical path, comprising:
   a wire, mounted within the laser resonant cavity, comprising a shape memory alloy, the wire having a first end, a second end, a length, and a shape along the length defining a perimeter of an aperture transverse to the optical path, and responsive to current flow through the wire to vary the length;
   control means, connected to the first and second ends of the wire, for supplying a controllable current through the wire to adjust the length of the perimeter of the aperture to suppress transverse modes within the resonant cavity having outside perimeters larger than the perimeter of the aperture.

4. The apparatus of claim 3, wherein the shape defining the perimeter of the aperture is helical.

5. A laser, comprising:
   a resonant cavity defining a resonant path, including means for coupling energy out of the resonant cavity;
   a gain medium mounted within the resonant cavity;
   means, coupled with the gain medium, for pumping the gain medium to induce laser action;
   a wire, mounted within the resonant cavity, comprising a shape memory alloy, the wire having a first end, a second end, a length, and a shape along the length defining a perimeter of an aperture transverse to the resonant path, and responsive to current flow through the wire to vary the length;
   control means, connected to the first and second ends of the wire, for supplying a controllable current through the wire to adjust the length of the perimeter of the aperture to suppress transverse modes within the resonant cavity having outside perimeters larger than the perimeter of the aperture.

6. The laser of claim 5, wherein the shape defining the perimeter of the aperture is helical.

7. The laser of claim 5, wherein the resonant cavity includes means for sealing the resonant path within a chamber, and the wire is enclosed within the chamber.

8. The laser of claim 7, further including means for positioning the wire so that the aperture is centered over the resonant path.

* * * * *